United States Patent [19]
Jeong

[11] Patent Number: 5,129,042
[45] Date of Patent: Jul. 7, 1992

[54] SORTING CIRCUIT USING NEURAL NETWORK

[75] Inventor: Ho-sun Jeong, Taegu, Rep. of Korea

[73] Assignee: Samsung Electronics Co., Ltd., Kyunggi, Rep. of Korea

[21] Appl. No.: 549,300

[22] Filed: Jul. 9, 1990

[30] Foreign Application Priority Data

Apr. 3, 1990 [KR] Rep. of Korea .............. 90-4511

[51] Int. Cl.⁵ .................. G06F 7/02; G06F 15/18
[52] U.S. Cl. .................. 395/27; 340/146.2
[58] Field of Search ............ 364/513, 900, 715.06; 365/189.07; 340/146.2; 395/24, 27

[56] References Cited

U.S. PATENT DOCUMENTS

| | | | |
|---|---|---|---|
| 4,012,627 | 3/1977 | Antoniak | 364/715.06 |
| 4,166,271 | 8/1979 | Thirlwall et al. | 340/146.2 |
| 4,802,103 | 1/1989 | Faggin et al. | 364/513 |
| 4,807,168 | 2/1989 | Moopenn et al. | 364/900 |
| 4,897,814 | 1/1990 | Clark | 365/189.07 |

Primary Examiner—Allen R. MacDonald
Assistant Examiner—George Davis
Attorney, Agent, or Firm—Cushman, Darby & Cushman

[57] ABSTRACT

A sorting circuit for arranging data in sequence according to the magnitudes of the data values, uses the concept of a neural network. The sorting circuit is constructed of shift registers, magnitude comparators, binary counters, binary bit separators and registers.

9 Claims, 3 Drawing Sheets

SORTING CIRCUIT USING NEURAL NETWORK

FIELD OF THE INVENTION

The present invention relates to a sorting circuit, and particularly to a sorting circuit which arranges data in sequence according to the magnitude of the data values.

BACKGROUND OF THE INVENTION

In signal processing, because much time is required for processing a great quantity of data solely by software, it has been desireable to fabricate integrated circuit chips which can be used for signal processing. Signal sorting is one of the most widely used methods for data processing and special computation.

A sorting circuit for signal sorting is disclosed by O. Vainio, Y. Neuvo, and S. Butner in "Sorter Based Signal Processor-A Versatile Tool for Median Type Filter Implementations", VLSI Signal Processing, IEEE. PRESS PP. 1610172, 1988. However, conventional sorting circuits, which are embodied by logic circuits, have high reliability but many drawbacks in actually processing a signal and in being used with other circuits. The drawbacks mainly result because of the complexity of the conventional sorting circuits.

SUMMARY OF THE INVENTION

It is an object of the present invention to provide a sorting circuit which has a simple circuit arrangement by using the concept of a neural network.

It is another object of the present invention to provide a sorting circuit which ensures a real time processing of an image recognition or speech recognition system by improving the processing speed of the signal sorting.

To accomplish the above objects, the present invention involves a sorting circuit which arranges M input data of N-bits in sequence according to the magnitude of the data values and utilizes a simple circuit arrangement comprising: M shift registers for converting the serial M input data of N-bits to parallel data; M magnitude comparators for outputting an excited state if the input data are greater than or equal to reference data, and for outputting a ground state if the former is less than the latter, after receiving the N-bit input data from each of the shift registers; a binary counter for supplying the reference data whose magnitude is changed in sequence according to a clock pulse given to the M magnitude comparators; a binary bit separator, having M output terminals which have respective ranking numbers, for receiving respective output signals from said M magnitude comparators, and then driving to the ground state the output terminals whose ranking numbers are smaller than or equal to the number of the magnitude comparators outputting the excited state and driving the remaining output terminals to excited states; M registers respectively connected to the respective M output terminals of said binary bit separator, for storing the reference data of the binary counter when said M registers are enabled upon the state transition of the corresponding output termlnals.

The magnitude comparator and the binary bit separator are characterized by comprising PMOS and NMOS transistors in a neural network arrangement.

These objects and features of the present invention will become more readily apparent from the following detailed description of the invention and the appended drawings.

DESCRIPTION OF THE PREFERRED EMBODIMENTS OF THE INVENTION

Figure 1:
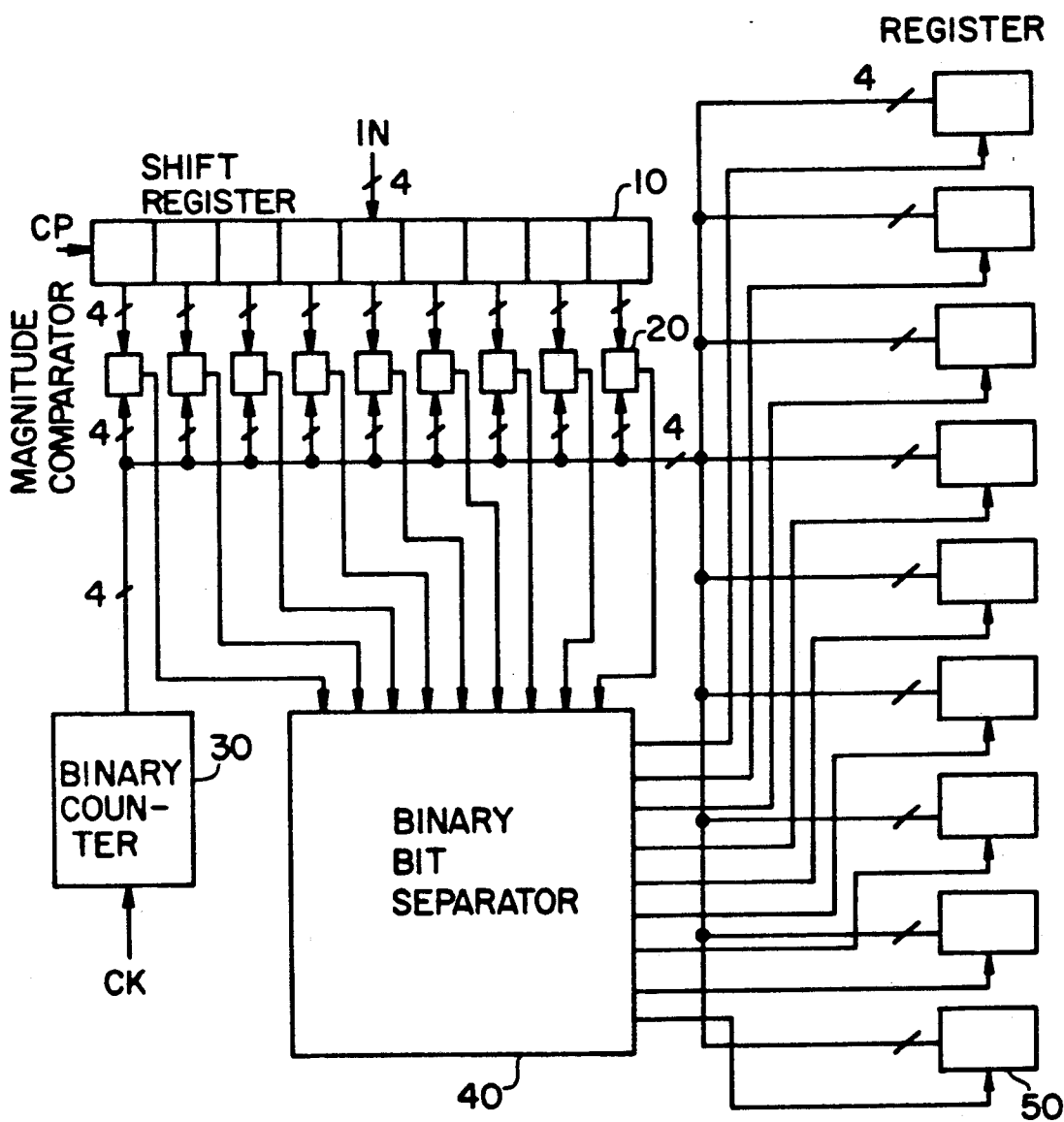
FIG. 1 shows a block diagram of a sorting circuit in accordance with the present invention.

FIG. 1 illustrates in block diagram, a sorting circuit in accordance with the present invention.

As shown in FIG. 1, one embodiment of a sorting circuit used in the present invention includes nine shift registers 10 and nine 4-bit magnitude comparators 20, in an external input portion; a hexadecimal down counter 30 in a reference input portion; a binary bit separator 40 in a central portion; and nine 4-bit registers 50 in an output portion.

A 4-bit signal inputted to the leftmost register is serially shifted to the right side by the pulse signal CP, shown in FIG. 1. After this operation is repeated 9 times, nine 4-bit data are stored in the 9 shift registers. Accordingly, the earliest input 4-bit signal is stored in the rightmost register and the latest input 4-bit signal is inputted to the leftmost register.

For example, if the input data are inputted in the order of 1011-0000-0001-1010-0011-1001-0111-0100-0010, the input data are shifted and stored in the shift registers in the order of 0010-0100-0111-1001-0011-1010-0001-0000-1011 from left to right. When this storage is completed, the down counter 30 counts the clock (CK) and outputs the count value to the respective reference input terminals of all the magnitude comparators in the order of 1111-1110-1101-1100-1011-1010-1001-1000-0111-0110--0101-0100-0011-0010-0001-0000.

In the magnitude comparators 20, the down counter values are respectively compared with the values received from the shift registers. Thus, for the above input data, before the down counter value becomes "1011", all magnitude comparators output the ground state of "0", and when the value becomes "1011", only the output of the rightmost magnitude comparator outputs the excited state of "1".

Accordingly, in the binary bit separator 40 "since" only one magnitude comparator 20 outputs the excited state, the state transition from the excited state to the ground state occurs only in the output terminal having the ranking number of 1. By this state transition, the top output-sided register which is connected to the output terminal having ranking number 1 is enabled, so that the current counter value of "1011" is stored in the top register.

On the other hand, according to the same operation, if the counter value becomes "1010", the outputs of the 6th magnitude comparator from the left side and the rightmost magnitude comparator become the excited states, so that the first ranking output terminal of the binary bit comparator keeps the ground state and the second ranking output terminal is changed from the excited state to the ground state. Thus, only the second output side register from the top is enabled and the current counter value of "1010" is stored in the second register.

The above mentioned operation is successively carried out according to the counting operation of the down counter, so that the output side registers store the values in the order of 1011-1010-1001-0111-0100-0011-0010-0001-0000 according to the magnitude from the top. Consequently, the actually sorted values are obtained by using the down counter.

Figure 2:
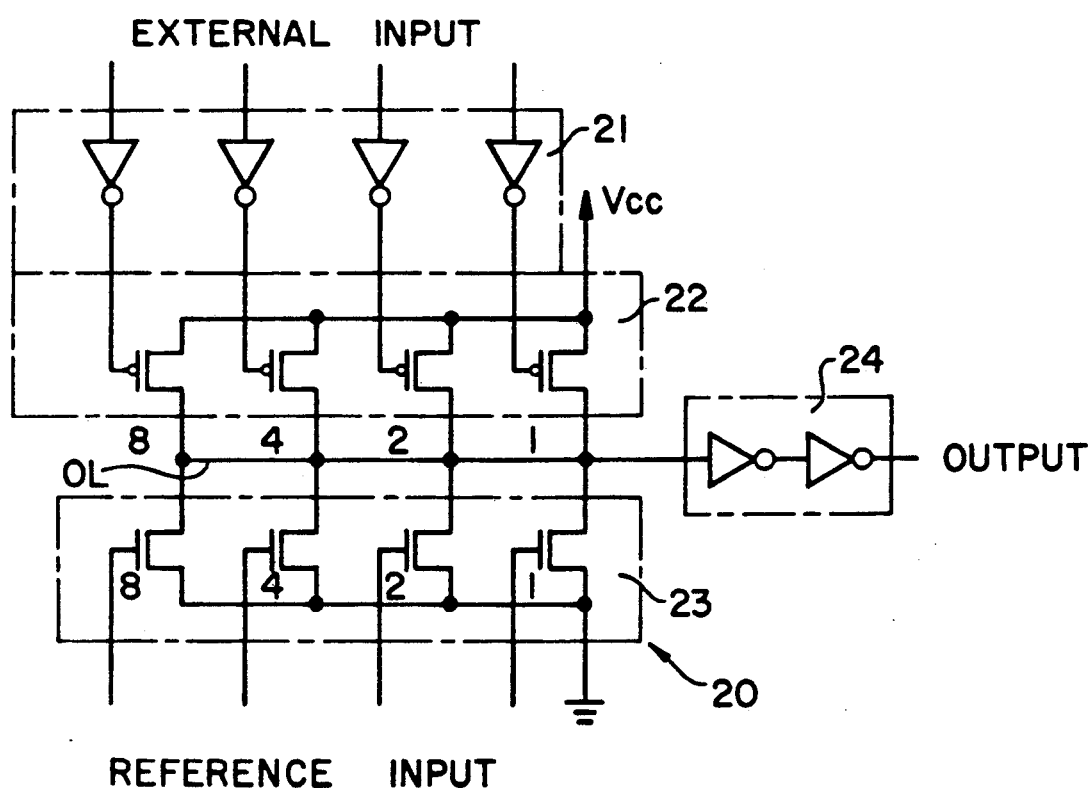
FIG. 2 shows a detailed circuit diagram of the magnitude comparator shown in FIG. 1.

As shown in FIG. 2, the 4-bit magnitude comparator 20 is composed of one output line OL; four inverters 21 for inverting the 4-bit data of the external input; four first synapses 22 comprising PMOS transistors for connecting a first power source voltage Vcc to the output line OL with a weighted connecting strength according to the value of the 8-4-2-1 input bit signal (which is inverted through the inverters 21); four second synapses 23 comprising NMOS transistors for connecting a second power source voltage GND to the output line OL with a weighted connecting strength according to the value of the 8-4-2-1 input bit signal received from the 4-bit down counter 30.

Also, the 4-bit magnitude comparator 20 is equipped with a neuron 24 for outputting an excited "1" state if the summation of the connecting strength of the first synapses is greater than or equal to that of the second synapses and for outputting a ground state (GND) or "0" state if the former is less than the latter.

A connecting strength of the synapses is determined by the geometric aspect ratio of width (W) to length (L) of the channel, that is, W/L of a MOS transistor. The reference W/L values are 6μm/2μm for PMOS transistors and 2μm/2μm for NMOS transistors. The neuron 24 is a CMOS buffer which connects two CMOS inverters serially, and the W/L values of the PMOS and NMOS transistors of each of the inverters are 12μm/2μm and 5μm/2μm, respectively. The outputs of the magnitude comparator 20 according to the various inputs are given in Table 1.

TABLE 1

| ext. input 8421 | ref. input 8421 | neuron input ($V_1$) | inverter ($V_2$) | output |
|---|---|---|---|---|
| 1111 | 0000 | 5.00 | 0.00 | 5 |
| 1001 | 0111 | 2.98 | 0.35 | 5 |
| 0001 | 0000 | 5.00 | 0.00 | 5 |
| 0001 | 0001 | 2.79 | 0.56 | 5 |
| 1001 | 1001 | 2.58 | 0.94 | 5 |
| 0000 | 0000 | 2.50 | 1.32 | 5 |
| 0000 | 0001 | 0.00 | 5.00 | 0 |
| 0011 | 1100 | 0.71 | 5.00 | 0 |
| 0000 | 1111 | 5.00 | 0.00 | 5 |

If the external input is "1011" and a reference input is "1011", the binary number "1011" has a decimal number, i.e., $1\times2^3+0\times2^2+1\times2^1+1\times2^0=8+0+2+1=11$. That is, the most significant digit "1" of the binary number "1011" has the weight value of $2^3$, the second significant digit "0" has the weight value of $2^2$, the third significant digit "1" has the weight value of $2^1$ and the least significant digit "1" has the weight value of $2^0$, so that the binary number "1011" is one of the codewords of 8-4-2-1 having the above weight values. Accordingly, to compare the above 4-bit binary number, the magnitude comparator sets the weight values of the respective synapses to correspond to the respective digits. To set these weight values, each of the synapses consists of a MOS transistor and the current driving capability of the MOS transistor, i.e., the geometrical aspect ratio is formed in the ratio of 8:4:2:1. Thus, in the case of PMOS transistors, the geometrical aspect ratios (the ratios of the channel width W to the channel length L; W/L) are set to be 8(6/2), 4(6/2), 2(6/2) and 6/2 [μm/μm] from left to right, and in the case of NMOS transistors, the geometrical aspect ratios are respectively set to be 8(2/2), 4(2/2), 2(2/2) and 2/2 [μm/μm] from left to right. As a result, when the external input and the reference input are all "1011", the sum of the connecting strength of the PMOS transistors is 8(6/2)+2(6/2)+6/2=11(6/2), and the sum of the connecting strength of NMOS transistors is 8(2/2)+2(2/2)+2/2=11(2/2). Accordingly, although they have the same value, i.e., 11 the connecting strength of the PMOS transistor, i.e., (6/2) is superior to the connecting strength of the NMOS transistor, i.e., (2/2), so that the potential of the output line OL becomes above 2.5 V. To facilitate the understanding of the above explanation, a table is provided below.

TABLE 2

|  |  | PMOS (hole as carrier) | NMOS (electron as carrier) |
|---|---|---|---|
| unit connecting strength, i.e., ratio of size | (A) | 6/2 | 2/2 |
| carrier mobilities | (B) | 1 | 2.2 |
| current driving capability | (C) | 3 | 2.2 |
| (Here, C = A × B) | | | |

Thus, if the potential of the output line OL is above 2.5 V, the output of, neuron 24 is 5 V and, if the potential is below 2.5 V, the output of the neuron is 0 V.

Figure 3:
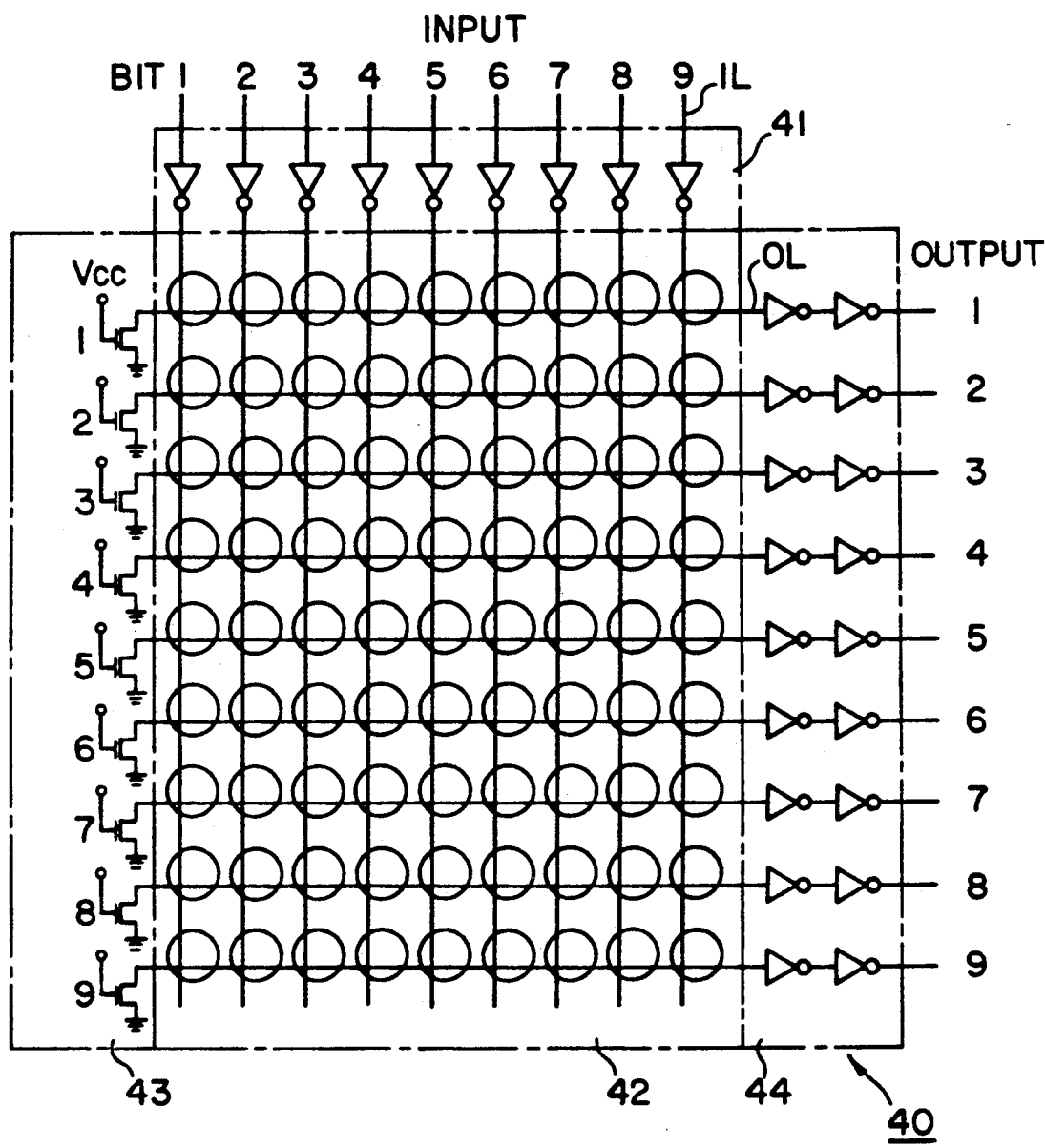
FIG. 3 and 3A show a detailed circuit diagrams of the binary bit separator shown in FIG. 1.

As shown in FIG. 3, the binary separator 40 has nine input lines IL and nine output lines OL. The respective input lines IL are connected to the inverter 41 in order to invert the output from the magnitude comparators 20.

Figure 3A:
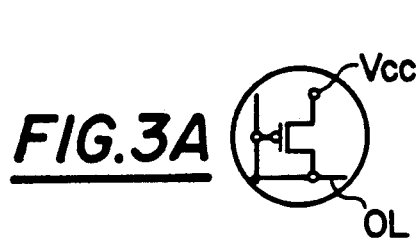

The input synapses 42 shown in greater detail in FIG. 3A comprise PMOS transistors for connecting the first power source voltage Vcc to the output lines OL in accordance with a weighted connecting strength and in accordance with the output from the inverter 41. The output lines OL are also biased with a weighted connecting strength in accordance with the sequential ranking order by the bias synapses 43. The bias synapses connect the power source voltage GND, by use of the NMOS transistors.

Also, each output line OL is provided with a neuron 44 for outputting an excited state Vcc if the summation of the connecting strength of the input synapse in the driving state is greater than or equal to that of the connecting strength of the driven bias synapse, and for outputting a ground state (GND) if the former is less than the latter.

The W/L value of the PMOS transistors herein is a unit connecting strength, that is, 6μm2μm and the W/L values of the NMOS transistors are 2μm2μm, 4μm2μm, 6μm2μm, 8μm2μm, 10μm2μm, 13μm2μm, 16μm2μm, 18μm2μm, 20μm2μm in order to give the sequential ranking order and bias to each output line.

The reason why the W/L values of the NMOS transistors are not 1,2,3, . . . 9 times as large as a reference value of 2μm2μm but increased a little more and more from the sixth value, is to give room for performing more precise operation, and it is noted that the W/L values can be determined by the value which multiplies the unit connecting strength by the ranking order value.

When any one input among the nine inputs is the only "1" state, then only one PMOS transistor in each terminal goes to the ON state. At this time, because the connecting strength of the PMOS transistor is a little higher than that of the NMOS transistor (by the above described MOS design), when the connecting strength of the PMOS transistor is identical to that of the NMOS transistor, only the first terminal outputs a larger value than 2.5V through the neuron and goes to a "1" state. On the other hand, the other terminals output smaller values than 2.5V and thus maintain a "0" state.

Next, when two inputs among the nine inputs are at the "1" state, two PMOS transistors in each terminal go to the ON state. The first terminal, that is, the first output line continues to maintain its "1" state because the summation of the connecting strength of the PMOS transistor is greater than that of the NMOS transistor.

In the case of the second output line, because the summation of the connecting strength of the two PMOS transistors becomes far greater than that of the NMOS transistor, in accordance with turning on one more PMOS transistor, the second terminal outputs a larger value than 2.5V through the neuron and therefore, the output terminal is changed from a "0" state into a "1" state. During repetition of the above described process, the output is changed into "1" states in sequence from the highest positional terminal, for as many as the number of the inputted "1" states.

The relationship of the output to the input of a binary bit separator is shown in Table 3.

TABLE 3

| Counter Output | Input data | | | | | | | | | Out data | | | | | | | | |
|---|---|---|---|---|---|---|---|---|---|---|---|---|---|---|---|---|---|---|
| | 2 | 4 | 7 | 9 | 3 | 10 | 1 | 0 | 12 | 1 | 2 | 3 | 4 | 5 | 6 | 7 | 8 | 9 |
| 12 | 0 | 0 | 0 | 0 | 0 | 0 | 0 | 0 | 1 | 1 | 0 | 0 | 0 | 0 | 0 | 0 | 0 | 0 |
| 10 | 0 | 0 | 0 | 0 | 0 | 1 | 0 | 0 | 1 | 1 | 1 | 0 | 0 | 0 | 0 | 0 | 0 | 0 |
| 9 | 0 | 0 | 0 | 1 | 0 | 1 | 0 | 0 | 1 | 1 | 1 | 1 | 0 | 0 | 0 | 0 | 0 | 0 |
| 7 | 0 | 0 | 1 | 1 | 0 | 1 | 0 | 0 | 1 | 1 | 1 | 1 | 1 | 0 | 0 | 0 | 0 | 0 |
| 4 | 0 | 1 | 1 | 1 | 0 | 1 | 0 | 0 | 1 | 1 | 1 | 1 | 1 | 1 | 0 | 0 | 0 | 0 |
| 3 | 0 | 1 | 1 | 1 | 1 | 1 | 0 | 0 | 1 | 1 | 1 | 1 | 1 | 1 | 1 | 0 | 0 | 0 |
| 2 | 1 | 1 | 1 | 1 | 1 | 1 | 0 | 0 | 1 | 1 | 1 | 1 | 1 | 1 | 1 | 1 | 0 | 0 |
| 1 | 1 | 1 | 1 | 1 | 1 | 1 | 1 | 0 | 1 | 1 | 1 | 1 | 1 | 1 | 1 | 1 | 1 | 0 |
| 0 | 1 | 1 | 1 | 1 | 1 | 1 | 1 | 1 | 1 | 1 | 1 | 1 | 1 | 1 | 1 | 1 | 1 | 1 |

The operation of one embodiment of the present invention as described above is explained. The input data are serially stored through the nine shift registers 10 during the predetermined clock cycle.

The nine data are respectively loaded to the external input of the 4-bit magnitude comparator 20 and the data outputted from the hexadecimal down counter 30 are loaded to the reference input portion of the magnitude comparator 20. As the outputs of the hexadecimal counter 30 are changed according to the change of the clock pulse, its output values become compared with all the input data.

At this time, in the initialized state in which the nine output terminals of the magnitude comparator are all set to the "0" state, if the output of one terminal is changed into the "1" state, that is, the largest value among the input data is searched, that is, the ninth output of the magnitude comparator 20 is changed into a "1" state when the value of the counter in the Table 2 becomes 12 by decreasing from 15, the output of the binary bit comparator 40 which is loaded into the clock of the 4-bit register 50 in the uppermost position, is changed into the "1" state.

In other words, the value "12" is read in from the hexadecimal counter 30 by enabling the register to store the uppermost value.

At this time, the clock of the used register is a rising edge trigger type whose register is enabled only when the output is changed from "0" to "1".

If this process is repeated, the nine input data are stored in the output register 50 by being sorted in the order of magnitude.

When the input data are loaded at random, the result of the data of the output register which are sorted from the larger value to the smaller value, is given in Table 4.

TABLE 4

| Input data | | | | Output data | | | |
|---|---|---|---|---|---|---|---|
| 0 | 0 | 1 | 0 | 1 | 0 | 1 | 1 |
| 0 | 1 | 0 | 0 | 1 | 0 | 1 | 0 |
| 0 | 1 | 1 | 1 | 1 | 0 | 0 | 1 |
| 1 | 0 | 1 | 1 | 0 | 1 | 1 | 1 |
| 0 | 0 | 1 | 1 | 0 | 1 | 0 | 0 |
| 1 | 0 | 1 | 0 | 0 | 0 | 1 | 1 |
| 0 | 0 | 0 | 1 | 0 | 0 | 1 | 0 |
| 0 | 0 | 0 | 0 | 0 | 0 | 0 | 1 |
| 1 | 0 | 1 | 1 | 0 | 0 | 0 | 0 |

If the hexadecimal down counter 30 is replaced by a hexadecimal up counter and a comparator which operates contrary to the 4-bit magnitude comparator 20 is used, then the data are sorted from the smaller value to the larger value.

As described above, a sorting circuit in accordance with the present invention can employ a simple circuit arrangement by using the concept of a neural network, instead of using logic circuits as in conventional sorting circuits. The present invention can be applied to a real time DSP, that is, Digital Signal Processing, because processing speed is very fast due to the small number of elements. The present invention also can be applied to a rank filter, because the data of the wanted rank can be obtained from the sorted result.

While a preferred embodiment of the present invention has been described and illustrated, the invention should not be limited thereto but may be otherwise embodied within the scope of the following claims.

What is claimed is:

1. A sorting circuit for arranging M input data of N-bits in sequence according to the magnitude of the M input data, comprising:
   M shift registers for converting said serial M input data of N-bits to parallel data;
   M magnitude comparators for outputting an excited state if the input data is greater than or equal to a reference data, and outputting a ground state if the former is less than the latter, after receiving the input data of N-bits from each of said M shift registers;

a binary counter for supplying reference data whose magnitude is changed in sequence according to a clock pulse to said M magnitude comparators;

a binary bit separator, having M output terminals which have respective ranking numbers, for receiving respective output signals from said M magnitude comparators, and then driving to the ground state the output terminals whose ranking numbers are smaller than or equal to the number of the magnitude comparators outputting the excited state and driving the remaining output terminals to excited states; and M registers respectively connected to the respective M output terminals of said binary bit separator, for storing the reference data of the binary counter when said M registers are enabled upon the state transition of the corresponding output terminals.

2. A sorting circuit as claimed in claim 1, wherein each of said M magnitude comparators comprises:

one output line;

N inverters for inverting said input data;

first synapses for connecting a first power source voltage to said output line as each of the connecting strength of weighting value according to the input data inverted by said inverter;

second synapses for connecting a second power source to said output line as each of the connecting strength of weighting value according to said reference data; and a neuron for outputting an excited if the summation of connecting strength of the first synapses is greater than or equal to that of the second synapses, and for outputting a ground state if the former is less than the latter, in the driving state, the neuron being connected to said output line.

3. A sorting circuit as claimed in claim 2, wherein said binary bit separator comprises M input lines;

M output lines which cross said input lines;

M inverters for inverting and inputting the output of said magnitude comparator to said each input line;

input synapses for connecting the first power source voltage to said output line as the unit connecting strength according to the output of said inverter at each cross section between said input line and output line;

bias synapses for biasing the output lines by connecting the second power source voltage to said M output lines as the connecting strength according to each sequential ranking order; and neurons for outputting an excited state if the summation of connecting strength of the input synapses in the driving state is greater than or equal to that of the drived bias synapse, and for outputting a ground state if the former is less than the latter, which are connected to said each line.

4. A sorting circuit as claimed in claim 3, wherein said first input synapses comprise PMOS transistors, and said second input synapses and bias synapses comprise NMOS transistors.

5. A sorting circuit as claimed in claim 4, wherein the connecting strength of said synapses is determined by a geometrical aspect ratio, that is, a width of a channel to a length of a channel (W/L) of a MOS transistor.

6. A sorting circuit as claimed in claim 5, wherein the unit connecting strength of said synapses is determined as W/L of 6μm2μm in the PMOS transistors and W/L of 2μm2μm in the NMOS transistors.

7. A sorting circuit as claimed in claim 3, wherein said neuron comprises a CMOS buffer which connects two CMOS inverters serially.

8. A sorting circuit as claimed in claim 1, wherein said binary counter performs a down counting in order to arrange the data in sequence starting from the larger value and ending with the smaller value.

9. A sorting circuit as claimed in claim 1, wherein said binary counter performs an up counting in order to arrange the data in sequence starting from the smaller value and ending with the larger value, and said magnitude comparators output an excited state if the magnitude of N-bit input data received from said each shift register is smaller than or equal to that of the reference data, and output a ground state if the former is greater than the latter.

* * * * *